United States Patent [19]

Inoue et al.

[11] 4,101,638
[45] Jul. 18, 1978

[54] PROCESS FOR THE MANUFACTURE OF A SLURRY CONTAINING HIGHLY CONCENTRATED PHOSPHORIC ACID AND CALCIUM SULFATE HEMIHYDRATE IN A READILY FILTERABLE FORM

[75] Inventors: Takasuke Inoue; Yuzo Itoh; Sataro Nakajima; Shin-Ichi Tajika; Yoshio Saiki, all of Fuchu, Japan

[73] Assignee: Nissan Chemical Industries, Ltd., Tokyo, Japan

[21] Appl. No.: 710,741

[22] Filed: Aug. 2, 1976

[30] Foreign Application Priority Data

Aug. 13, 1975 [JP] Japan ................. 50-098305

[51] Int. Cl.² .......................................... C01B 25/16
[52] U.S. Cl. .................................. 423/320; 423/167; 423/555
[58] Field of Search .................. 423/167, 320, 321 R, 423/555, 319

[56] References Cited

U.S. PATENT DOCUMENTS

| 1,969,449 | 8/1934 | Bryan ............................. 423/555 |
| 3,505,013 | 4/1970 | Araki et al. ..................... 423/167 |
| 3,653,826 | 4/1972 | Ishihara et al. ................. 423/320 |

FOREIGN PATENT DOCUMENTS

| 1,248,037 | 9/1971 | United Kingdom ............. 423/167 |
| 1,278,247 | 6/1972 | United Kingdom ............. 423/320 |

Primary Examiner—O. R. Vertiz
Assistant Examiner—Eugene T. Wheelock
Attorney, Agent, or Firm—Brisebois & Kruger

[57] ABSTRACT

The present invention relates to a wet process for the manufacture of phosphoric acid, which process essentially comprises a digestion step in which phosphate rock is digested by means of phosphoric acid and sulfuric acid to form a slurry containing highly concentrated phosphoric acid together with calcium sulfate hemihydrate, and a separation step in which the slurry is filtered for separation of calcium sulfate hemihydrate from the highly concentrated phosphoric acid (in which the concentration of $P_2O_5$ in the product acid is higher than 40% by weight, based on the weight of the product acid) and which is characterized by supplying active silica at a ratio of 0.2–5% by weight, based on the weight of phosphate rock, in order that active silica may be present in the above mentioned digestion step.

6 Claims, 5 Drawing Figures

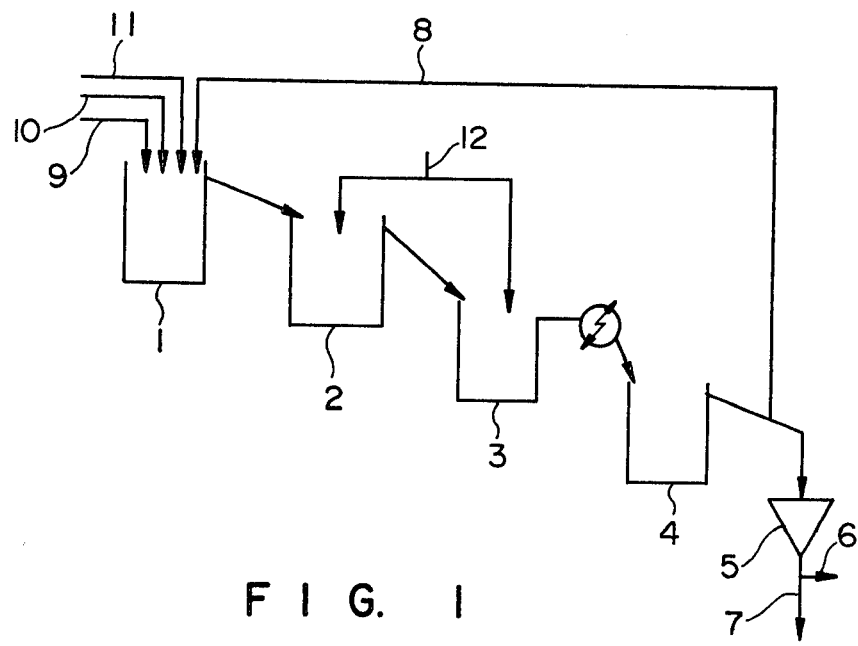
F I G. 1

PROCESS FOR THE MANUFACTURE OF A SLURRY CONTAINING HIGHLY CONCENTRATED PHOSPHORIC ACID AND CALCIUM SULFATE HEMIHYDRATE IN A READILY FILTERABLE FORM

BRIEF DESCRIPTION OF THE DRAWINGS

FIGS. 1 and 5 are flow-sheets which show two embodiments of the invention to facilitate an understanding of the process of the present invention.

DETAILED DESCRIPTION OF THE INVENTION

Figure 2:
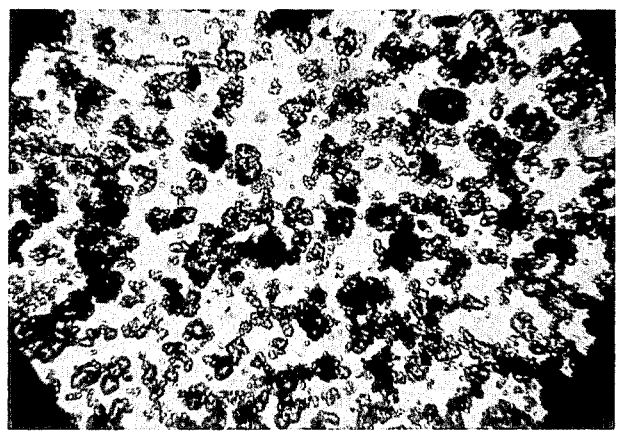
FIGS. 2 and 3 are microscopic photographs which show the state of agglomeration of calcium sulfate hemihydrate in the absence and presence of active silica, respectively.

The present invention relates to an improved wet process for the manufacture of highly concentrated phosphoric acid (in which the concentration of $P_2O_5$ in the product acid is higher than 40% by weight, based on the weight of the product acid), which process is characterized by the step of allowing active silica to be present in the wet process for obtaining phosphoric acid, in particular highly concentrated phosphoric acid, whereby easily filterable calcium sulfate hemihydrate is formed and highly concentrated phosphoric acid is efficiently obtained.

A process for obtaining highly concentrated phosphoric acid is already known, in which phosphate rock is digested by means of phosphoric acid and sulfuric acid to form highly concentrated phosphoric acid together with calcium sulfate hemihydrate in the stable range for calcium sulfate hemihydrate, and the mixture is then filtered to separate highly concentrated phosphoric acid. In this case, there are two technical problems encountered when carrying out the process on a commercial scale. One problem is how to increase the digestion rate of phosphate rock to efficiently obtain highly concentrated phosphoric acid, and the other is how to efficiently separate the by-product calcium sulfate hemihydrate from the phosphoric acid product.

It has been common technical knowledge in the field of phosphoric acid manufacture that separation by filtration of calcium sulfate hemihydrate existing in a highly concentrated solution of phosphoric acid is extremely difficult. Because calcium sulfate hemihydrate contained in the slurry which has been formed in the stable range for calcium sulfate hemihydrate in a highly concentrated solution of phosphoric acid appears in very fine crystals, its separation by filtration on a commercial scale if very difficult, even though it is not difficult in the laboratory. Therefore, the hemihydrate process has seldom been employed for industrial purposes, although it has been known for many years.

In the calcium sulfate dihydrate process, which has been in commercial use for the manufacture of phosphoric acid, calcium sulfate dihydrate which is comparatively easy to filter is formed and then filtered to separate it from the phosphoric acid. However, this process does not produce phosphoric acid of higher concentration than about 30% of $P_2O_5$ and a further concentrating process is required to obtain phosphoric acid of high concentration.

It is a well known fact, as described in U.S. Pat. No. 1,776,595, that calcium sulfate hemihydrate is stable at relatively high temperatures and at a high concentration of phosphoric acid. Also, it is well known to those skilled in the art that a variety of difficulties arise during the actual industrial implementation of the wet process for manufacture of phosphoric acid. Specifically, it is very difficult to filter and separate out the crystals of calcium sulfate hemihydrate which are, inherently, very fine needle-shaped or rectangular crystals (having dimensions of 1 to $10\mu$). Success in the calcium sulfate hemihydrate process on an industrial scale depends on how efficiently the separation by filtration of calcium sulfate hemihydrate can be carried out.

There have been a number of investigations to overcome these difficulties. To mention one example, Japanese Patent Sho 43-15894 proposed a process in which phosphate rock is digested step by step at specified reaction ratios and a slurry containing seed crystals is circulated to separate the calcium sulfate hemihydrate formed. Similarly, U.S. Pat. No. 2,885,264 suggests a method for carrying out the separation by filtration of calcium sulfate hemihydrate from phosphoric acid solution upon digestion of phosphate rock, while regulating the reaction ratio in the digestion step within a specified range.

Also, the present inventors have previously proposed in Japanese Patent Sho 45-10408 (U.S. Pat. No. 3,653,826) a process for the filtration and hydration of the hemihydrate in which calcium sulfate hemihydrate is formed during a digestion step and filtered off, then calcium sulfate dihydrate of good quality is obtained by hydration during a hydration step and, finally, highly concentrated phosphoric acid is recovered. In this process, easily filterable agglomerate crystals of calcium sulfate hemihydrate can be obtained in the following manner: Phosphate rock is digested under specified conditions, i.e., it is first mixed with phosphoric acid, and then sulfuric acid is added into the mixture, whereby 70–80% of the CaO existing in the phosphate rock combines with sulfur to form calcium sulfate hemihydrate and the other 20–30% of the CaO is transformed into calcium dihydrogen phosphate [$Ca(H_2PO_4)_2$]. Then more sulfuric acid is added to the mixture, in order to turn the calcium phosphate into calcium sulfate hemihydrate and phosphoric acid under conditions such that 2–3% of free sulfuric acid will be present in the reaction vessel. The present inventors found that agglomerate crystals of calcium sulfate hemihydrate having good filtrability can be obtained by recycling a part of the slurry formed into a digestion system. Thus, a method using hemihydrate filtration and hydration has become industrially practical.

These hemihydrate processes for the manufacture of highly concentrated phosphoric acid are intended to produce comparatively easily filtrable calcium sulfate hemihydrate under the specified reaction conditions. The present inventors have conducted further investigations and found that by allowing active silica to exist in the digestion process in which phosphate rock is digested by means of phosphoric acid and sulfuric acid to produce calcium sulfate hemihydrate, a more easily filtrable calcium sulfate hemihydrate in the form of higher agglomerate crystals can be obtained.

On the other hand, in the conventional processes for the manufacture of low concentration phosphoric acid, for example, the method described in Japanese Patent Sho 36-15016, it was known that the addition of easily reactive silicate substances accelerates the crystal growth and improves the crystal form of calcium sulfate dihydrate. However, this technique is intended to secure the effect of reactive silicate in connection with the hydration of hemihydrate into dihydrate in the calcium sulfate hemihydrate-dihydrate process for the manufacture of low-concentration phosphoric acid. In this process, only a low-concentration of phosphoric acid product containing approximately 30% of $P_2O_5$ is obtained and the filtered by-product is calcium sulfate dihydrate, but not hemihydrate.

Moreover, in the process disclosed in Japanese Patent Sho-48-9278, active silica is added to obtain pillar-shaped crystals of calcium sulfate hemihydrate, when calcium sulfate dihydrate is converted into the hemihydrate with a mixed acid ($P_2O_5$ concentration of about 20% and $H_2SO_4$ concentration of 24–35%) after separation of calcium sulfate dihydrate from phosphoric acid in the process for the manufacture of low-concentration phosphoric acid. This technique does not produce highly concentrated phosphoric acid by digestion of phosphate rock, but is applied only for transition from dihydrate to hemihydrate.

On the contrary, the purpose of the present invention is to obtain highly concentrated phosphoric acid (in which the $P_2O_5$ concentration is higher than 40%) together with easily filtrable agglomerate crystals of calcium sulfate hemihydrate.

The present invention relates to a wet process for the manufacture of phosphoric acid, in which phosphate rock is digested by means of phosphoric acid and sulfuric acid to produce a slurry containing highly concentrated phosphoric acid together with calcium sulfate hemihydrate, and the slurry is filtered to separate calcium sulfate hemihydrate from highly concentrated phosphoric acid (a phosphoric acid product which contains at least 40% of $P_2O_5$). This process is characterized by adding or supplying active silica from outside into the digestion step of the above mentioned manufacturing process, in order to provide a sufficient amount of silica for the formation of easily filtrable, agglomerate crystals of calcium sulfate hemihydrate. The term "active silica" as used in this specification means silica which reacts easily with hydrogen fluoride (HF). Representative examples include bentonite and allophane, and especially diatomaceous earth and silica gel. The amount of active silica added should be sufficient to form easily filtrable, agglomerate calcium sulfate hemihydrate, for example, 0.2–5% by weight, based on the amount of phosphate rock supplied. 0.5–2% by weight is most effective. Active silica may be added or supplied together with any phosphate rock and acid for digestion, and may be introduced into the digester or circulated slurry. Also in the process for the manufacture of phosphoric acid by the closed system of the calcium sulfate hemihydrate-filtration-dihydration process (described in Example 3), in which calcium sulfate hemihydrate produced by the above mentioned method is first filtered off to separate and recover highly concentrated phosphoric acid and then calcium sulfate hemihydrate is hydrated in diluted acid to obtain calcium sulfate dihydrate, satisfactory results according to the present invention can be achieved when active silica is added into the digestion step or into the hydration step in which calcium sulfate hemihydrate is transformed into dihydrate.

The presence of active silica in the digestion step exerts a clearly accelerating effect on the agglomeration of calcium sulfate hemihydrate crystals, although the reason is not clear. This effect will be explained in more detail in the Working Examples. It was confirmed that the existence of active silica in the digestion step evidently enhances the degree of agglomeration of calcium sulfate hemihydrate crystals and markedly improves the filtrability as compared to a process in which no silica is used. Specifically, the present inventors found that when active silica is allowed to be present in the digestion step, the specific surface area of agglomerated crystals of calcium sulfate hemihydrate gradually decreases, depending on its amount. Microscopic observation revealed that the manner of agglomeration of crystals evidently changed as compared to that appearing when no silica was added. The effect is shown in the photograph attached. As a result, the filtrability of calcium sulfate hemihydrate was markedly improved, so that a high commercial value was attained, as compared with conventional processes (in which there was no addition of active silica).

The effect attained, the production of easily filtrable, agglomerate crystals of calcium sulfate hemihydrate by allowing active silica to be present during the process for manufacturing phosphoric acid has been discovered by the present inventors for the first time. This step of the present invention can be applied to any wet process for the manufacture of phosphoric acid, in which the agglomerated calcium sulfate hemihydrate formed is to be filtered out and separated from highly concentrated phosphoric acid. The process according to the present invention will now be exemplified in greater detail.

EXAMPLE 1

Phosphoric acid was prepared by using the experimental apparatus described below.

Referring first to FIG. 1, reference numeral 1 indicates a pre-mixer having an effective volume of 0.5l; 2 the first digester having a 3l volume; 3 the second digester having a 3l volume, 4 a 1.5l volume receiver tank. Each of the vessels is equipped with a suitable agitator. Reference numeral 5 indicates a filter for filtration of the cake containing calcium sulfate hemihydrate subjected to suction by vacuum pump 6, whereby the phosphoric acid product 7 is recovered. A part of the slurry containing calcium sulfate hemihydrate is circulated through line 8 into the pre-mixer 1.

Phosphoric acid was produced from phosphate rock having the following composition by using the above mentioned apparatus.

Phosphate rock A (72BPL from Florida)
$P_2O_5$—33.7%, CaO—48.7%,
F—4.0%, $SiO_2$—5.2%

Crushed phosphate rock was charged into pre-mixer 1 through line 9 at the rate of 555 g/hr. Digesting acid containing 38.5% of $P_2O_5$ and 4.5% of $H_2SO_4$ was added through line 10 at the rate of 1817 g/hr; active silica was introduced through line 11, and all the materials introduced into pre-mixer 1 were well mixed. The slurry formed was permitted to overflow into the first digester 2 where it reacted with 98% sulfuric acid supplied through line 12 at the rate of 230 g/hr, and then the reaction mixture was permitted to overflow into the second digester 3. Then, 98% sulfuric acid was introduced at the rate of 390 g/hr into the second digester 3 and the slurry formed was introduced into receiver tank 4, after which its temperature was lowered by the cooler. A part of the slurry formed was circulated at 3064 g/hr through line 8 into premixer 1 and the rest of the slurry was introduced into filter 5 to recover the acid product (having a $P_2O_5$ content of 45.3%) by suction filtration.

The reaction temperature and reaction time in the above described reaction was as follows:

|  | Pre-mixer 1 | First digester 2 | Second digester 3 | Receiver tank 4 |
|---|---|---|---|---|
| Temperature (° C) | 75–80 | 90–95 | 90–95 | 70–75 |
| Time (hour) | 0.3 | 2.0 | 2.0 | 1.0 |

Comparison of Specific Surface Area of Calcium Sulfate Hemihydrate Crystals

The calcium sulfate hemihydrate cake remaining on filter 5 was taken out, washed with methanol and dried, and the specific surface area was measured according to the Blaine method (JIS-R-5201). The result is shown in Table 1:

Table 1

| Test No. | Phosphate rock used | Addition of active silica | | Specific surface area (cm²/g) |
|---|---|---|---|---|
|  |  | Additives | Amount (%) |  |
| 1 | Phosphate rock A | None | 0 | 3155 |
| 2 | " | Diatomaceous earth ($SiO_2$:78%) | 0.2 | 2950 |
| 3 | " | " | 0.5 | 2400 |
| 4 | " | " | 1.0 | 2120 |
| 5 | " | " | 2.0 | 2050 |
| 6 | " | " | 5.0 | 2030 |
| 7 | " | Silica gel (reagent) | 0.5 | 2300 |

The amount of active silica added is expressed in Table 1 in % by weight based on the weight of phosphate rock. It can be seen that the specific surface area decreases with the increasing amount of supplied silica compared to that in the test in which silica was not added (which represents the method now conventionally employed). The smaller the specific surface area, the better the filtrability.

EXAMPLE 2

Phosphoric acid was produced by using apparatus having the same structure as shown in FIG. 1, but on a larger scale than in Example 1.

Specifically, the apparatus consisted of a pre-mixer having an effective volume of 3.3 m³ and two digesters having a volume of 29 m³ were employed. Phosphate rock B (supplied at the rate of 3.75 t/hr) having the following composition was mixed with diatomaceous earth (supplied at the rate of 0.04 t/hr) in the pre-mixer and phosphoric acid for digestion containing 38.5% of $P_2O_5$ and 4.5% of $H_2SO_4$ (at the rate of 9.52 t/hr) and the circulating part of the slurry (at the rate of 20.6 t/hr) at 75° C were added into the pre-mixer. The reaction was carried out and the slurry formed at 75° C was permitted to overflow into the first decomposition (digestion) vessel.

Phosphate rock B (72BPL from Florida)
$P_2O_5$—33.2%, CaO—49.6%,
F—4.1%, $SiO_2$—3.4%

Next, 96.5% sulfuric acid was introduced (at the rate of 1.84 t/hr) into the first digester and the reaction was carried out at 95° C for 2.5 hours. The product was permitted to overflow into the second digester. Additional 96.5% sulfuric acid was added (at the rate of 1.31 t/hr) to the second digester and the reaction was continued at 95° C. After completion of the reaction, the slurry was cooled to 75° C to obtain a cool slurry (at the rate of 36.2 t/hr). The cool slurry was filtered by a tilting-pan rotary filter (having a filtration area of 12 m²) at the rate of 15.6 t/hr and washed with a solution (introduced at the rate of 4.00 t/hr) containing 17.1% of $P_2O_5$ and 8.2% of $H_2SO_4$. Thus a slurry filtrate (at the rate of 6.27 t/hr) containing 45.2% of $P_2O_5$ and 3.8% of $H_2SO_4$, a wash filtrate (at the rate of 5.99 t/hr) containing 34.6% of $P_2O_5$ and 4.9% of $H_2SO_4$ and a calcium sulfate hemihydrate cake (at the rate of 7.34 t/hr) were obtained.

The production of phosphoric acid was carried out using phosphate rock A in Example 1 instead of phosphate rock B, using the same procedure as described above. Furthermore, reactions were carried out using phosphate rocks A and B in the same process as described above, but without the addition of diatomaceous earth, and the results were compared.

Comparison of Filtrability of Slurries Containing Calcium Sulfate Hemihydrate

The filtrability of slurries containing calcium sulfate hemihydrate obtained as in the above mentioned examples was measured.

"Filtrability", as used in this specification means the amount of slurry filtered within a certain filtration time, which is calculated in terms of the amount of phosphoric acid. In this case, one rotation cycle of the filter was set at 6 minutes and the filtration time, including both slurry filtration and washing filtration was set at 4½ minutes. The quantity of phosphoric acid is calculated per unit area of effective filtration area (12 m²) for the above filtration time. The result is indicated in Table 2.

Table 2

| Test No. | Phosphate rock used | Addition of active silica | | Filterability (tons $P_2O_5$/m² day) |
|---|---|---|---|---|
|  |  | Additives | Amount (%) |  |
| 8 | Phosphate rock B | None | 0 | 2.0 |
| 9 | " | Diatomaceous earth ($SiO_2$:78%) | 1.0 | 3.0 |
| 10 | Phosphate rock A | None | 0 | 2.5 |
| 11 | " | Diatomaceous earth ($SiO_2$:78%) | 1.0 | 3.3 |

The addition amount of active silica mentioned in Table 2 means % by weight based on the weight of phosphate rock. It is evident that the filtrability is higher than when no silica is added.

Comparison of the Agglomerability of Calcium Sulfate Hemihydrate Crystals

Figure 3:
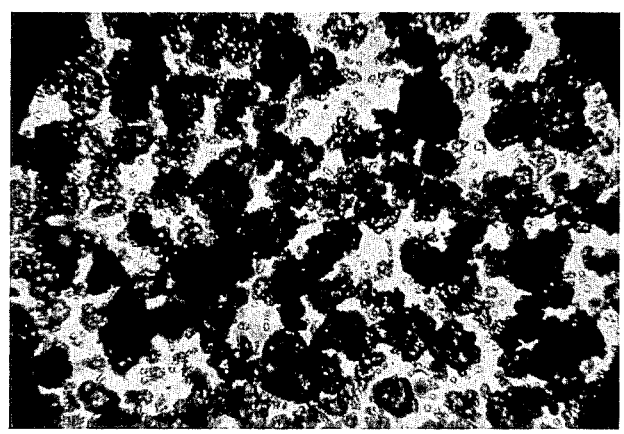
Figure 4:
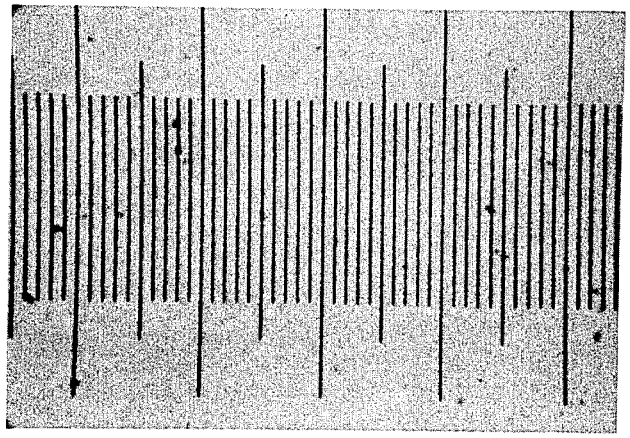
FIG. 4 is a photograph showing the enlarged scale used in FIGS. 2 and 3.

Calcium sulfate hemihydrate cakes obtained in Tests Nos. 8 and No. 9 were taken out and the states of the agglomerated calcium sulfate hemihydrate cyrstals were microscopically observed. The results are shown in FIGS. 2 and 3. As can be clearly seen from the photographs, FIG. 3 (1% silica added) shows a markedly higher agglomeration state than FIG. 2 (no addition). It is obvious that the existence of active silica favorably affects crystallization of calcium sulfate hemihydrate.

EXAMPLE 3

Figure 5:
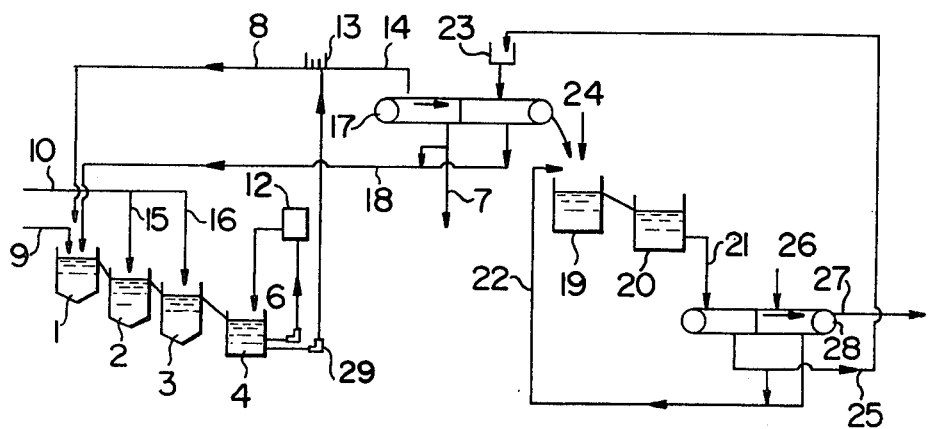

By using the apparatus shown in the flow-sheet of FIG. 5, the preparation of highly concentrated phosphoric acid was carried out in a closed system, in which phosphate rock B was digested under the same digestion conditions as in Example 2 using the same pre-mixer 1, the first digester 2, the second digester 3 and receiver tank 4 described in Example 2. The calcium sulfate hemihydrate formed was converted into dihydrate in the hydration step after separation by filtration from the phosphoric acid, and the filtrate of the dihydrate slurry was employed as the washing liquid for hemihydrate.

As was shown in the figure, a measured powder of phosphate rock was added through line 9 into pre-mixer 1. The acid for digestion, which had been prepared from the wash filtrate of calcium sulfate hemihydrate at the second section of filter 17 and a part of the phosphoric acid product, were introduced through line 18 into pre-mixer 1. Also, the circulation slurry from receiver tank 4 was introduced into slurry distributor 13 by means of pump 29. After the slurry was divided, one part of it was then introduced into pre-mixer 1 through line 8. This slurry was permitted to overflow into the first digester 2. Sulfuric acid was introduced into the first digester 2 through line 15 which branches from line 10. Then the slurry was permitted to overflow into the second digester 3, to which sulfuric acid was added through line 16, branching from line 10. The slurry which was completely digested in the second digester 3 was introduced into receiver tank 4 and then into cooler 12 by means of pump 6 to be cooled. The cooled slurry was delivered to slurry distributor 13 by means of pump 11 and divided. A part of the slurry was introduced into filter 17 through line 14. The rest of the slurry was recycled into pre-mixer 1 through line 8. The phosphoric acid product 7 separated by means of the calcium sulfate hemihydrate filter 17 was introduced into the storage tank, except for a part of phosphoric acid which was used for adjusting the concentration of the digesting acid.

Moreover, calcium sulfate hemihydrate cake separated from the phosphoric acid was washed with the filtrate coming through line 25 from the first section of dihydrate filter 28 at the second section of calcium sulfate hemihydrate filter 17. This wash filtrate was introduced into pre-mixer 1 through line 18 after it was adjusted with phosphoric acid product, as was mentioned above. Thus, the washed hemihydrate was transferred into the first hydration vessel 19 and repulped with the wash filtrate of the second section in the calcium sulfate dihydrate filter 28 and a part of filtrate of the first section, which were added through line 22. Sulfuric acid was introduced through line 24 into the hydration vessel 19. 23 is a neutralizer.

Then, the slurry in the first hydration vessel 19 was permitted to overflow into the second hydration vessel, where transition into calcium sulfate dihydrate was completed, and was then transferred through line 21 into the first section of the calcium sulfate dihydrate filter 28 and filtered.

The calcium sulfate product was washed at the second section of filter 28 with cold or hot water supplied through line 26 and the calcium sulfate dihydrate product was obtained from 27.

A part of the filtrate from the first section was introduced through line 25 and used to wash the calcium sulfate hemihydrate, as was mentioned before.

Highly concentrated phosphoric acid was produced using the above described apparatus and the following process:

Phosphate rock B (at the rate of 3.75 t/hr), digesting acid containing 38.5% of $P_2O_5$ and 4.5% of $H_2SO_4$ (at the rate of 9.52 t/hr) and the circulation slurry at 75° C (at the rate of 20.6 t/hr) were reacted in pre-mixer 1 and the slurry formed at 75° C was permitted to overflow into the first digester 2. Then, 96.5% sulfuric acid (at the rate of 1.84 t/hr) was introduced into the first digester 2 and the reaction was carried out at 95° C for 2.5 hours. The slurry formed was permitted to overflow into the second digester 3 where the reaction was continued at 95° C by adding more 96.5% sulfuric acid (at the rate of 1.31 t/hr). After the completion of the reaction, the slurry was cooled to 75° C to obtain a cool slurry (at the rate of 36.2 t/hr). The cool slurry was filtered by means of a tilting-pan rotary filter (having an effective filtration area of 12 m$^2$) at the rate of 15.6 t/hr and washed with a liquid (supplied at the rate of 4.00 t/hr) containing 17.1% of $P_2O_5$ and 8.2% of $H_2SO_4$. A slurry filtrate (at the rate of 6.27 t/hr) containing 45.2% of $P_2O_5$ and 3.8% of $H_2SO_4$, a wash filtrate (at the rate of 5.99 t/hr) containing 34.6% of $P_2O_5$ and 4.9% of $H_2SO_4$ and a calcium sulfate hemihydrate cake (at the rate of 7.34 t/hr) were obtained. The whole wash filtrate and a part of the slurry filtrate (at the rate of 3.53 t/hr) were mixed and used as digesting acid as mentioned above.

Calcium sulfate hemihydrate cake was mixed with a solution (supplied at the rate of 6.32 t/hr) containing 12.2% of $P_2O_5$ and 5.6% of $H_2SO_4$ to prepare a slurry which was introduced into the first hydration vessel 19 having an effective volume of 70 m$^3$, wherein calcium sulfate hemihydrate was converted into the dihydrate upon addition of 96.5% sulfuric acid (at the rate of 0.34 t/hr). Diatomaceous earth (at the rate of 0.035 t/hr) was introduced into the first hydration vessel 19 during the reaction. The slurry in the first hydration vessel 19 was permitted to overflow into the second hydration vessel 20 which had the same volume as the first hydration vessel to complete the transition to dihydrate. The calcium sulfate dihydrate slurry thus prepared was filtered through a band type filter 28 (having an effective filtration area of 8 m$^2$) at a rate of 14 t/hr and washed with hot water of 50° C (suppled at the rate of 3.92 t/hr). A slurry filtrate of dihydrate containing 17.1% of $P_2O_5$ and 8.2% of $H_2SO_4$ (at the rate of 6.03 t/hr), a wash filtrate containing 9.5% of $P_2O_5$ and 4.4% of $H_2SO_4$ (at the rate of 4.29 t/hr), and calcium sulfate dihydrate cake (7.6 t/hr) were obtained.

The filtrate of calcium sulfate dihydrate slurry was used as wash liuid for the filtration of calcium sulfate hemihydrate slurry at a rate of 4.00 t/hr and the remaining 2.03 t/hr was mixed with wash filtrate of dihydrate (at the rate of 4.29 t/hr), which was circulated into the first hydration vessel 19 as a solution for preparing the slurry.

The filtrability of the slurry containing calcium sulfate hemihydrate produced by this process was measured as in Example 2.

The filtrability of the slurry was 2.9 t.$P_2O_5$/m$^2$.day.

It is clearly higher than the (2.0 t.$P_2O_5$/$m^2$.day) in the case of no additives indicated in Test No. 8 in Table 2 of Example 2.

The amount of diatomaceous earth added corresponds to 0.93% by weight based on the weight of phosphate rock in the present example.

As was explained in each example, it was confirmed that the presence of active silica improved the filterability of the calcium sulfate hemihydrate.

This improvement in the filterability of calcium sulfate hemihydrate formed in the wet processes for the production of phosphoric acid renders the process substantially superior from a commercial point of view, because it makes it possible to reduce the filtration area.

The process of the present invention offers valuable technology which improves the conventional hemihydrate processes and hemihydrate-filtration-dihydration processes for the production of highly concentrated phosphoric acid.

The above described examples have been given as working examples of the process of the present invention. It is needless to say that the process of the present invention is not limited to the details of these examples.

What is claimed is:

1. In a wet process for the manufacture of highly concentrated phosphoric acid, which process comprises a digestion step in which phosphate rock is digested by phosphoric acid and sulphuric acid to produce a slurry containing phosphoric acid having a $P_2O_5$ concentration in excess of 40%, together with calcium sulfate hemihydrate and a separation step in which the slurry is filtered to separate said calcium sulfate hemihydrate from said highly concentrated phosphoric acid, the improvement which comprises the step of introducing active silica during the digestion step.

2. Process according to claim 1, wherein a silica which reacts readily with hydrogen fluoride is used as active silica.

3. Process according to claim 1, in which said active silica is introduced as a component of a diatomaceous earth or silica gel.

4. Process according to claim 1, wherein active silica exists in the digestion step in a 0.5-2% by weight amount.

5. Process according to claim 1, which further comprises a hydration step in which the separated calcium sulfate hemihydrate is converted into dihydrate by reaction with a mixture of diluted phosphoric acid and sulfuric acid, the filtrate obtained upon filtration to separate said dihydrate is circulated as a washing liquid for said hemihydrate, and a part of the phosphoric acid obtained upon filtration of said calcium sulfate hemihydrate is recycled and reused as the digesting acid.

6. Process according to claim 5, wherein active silica is added during the hydration step.

* * * * *